United States Patent
Heuver

(10) Patent No.: US 8,978,862 B2
(45) Date of Patent: Mar. 17, 2015

(54) PARK BRAKE ACTUATOR

(71) Applicant: Ford Global Technologies, LLC, Dearborn, MI (US)

(72) Inventor: Bradley R. Heuver, South Lyon, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 184 days.

(21) Appl. No.: 13/761,524

(22) Filed: Feb. 7, 2013

(65) Prior Publication Data

US 2014/0216885 A1 Aug. 7, 2014

(51) Int. Cl.
| | |
|---|---|
| *F16H 63/34* | (2006.01) |
| *B60T 1/06* | (2006.01) |
| *B60T 1/00* | (2006.01) |
| *F16D 63/00* | (2006.01) |
| *F16H 63/48* | (2006.01) |
| *F16D 121/04* | (2012.01) |
| *F16D 125/66* | (2012.01) |

(52) U.S. Cl.
CPC ............ *B60T 1/005* (2013.01); *F16H 63/3425* (2013.01); *F16H 63/3483* (2013.01); *F16H 63/483* (2013.01); *B60T 1/062* (2013.01); *F16D 63/006* (2013.01); *F16D 2121/04* (2013.01); *F16D 2125/66* (2013.01)
USPC ..................................................... 192/219.5

(58) Field of Classification Search
CPC ............ F16H 63/3425; F16H 63/3483; F16H 63/3491; F16H 63/483
USPC ................................ 192/219.4, 219.5, 219.6
See application file for complete search history.

(56) References Cited

U.S. PATENT DOCUMENTS

| | | | |
|---|---|---|---|
| 2,974,752 | A | 3/1961 | Howard |
| 6,378,393 | B1 | 4/2002 | Bates |
| 6,701,797 | B2 | 3/2004 | Heuver |
| 6,983,668 | B2 | 1/2006 | Powell et al. |
| 7,082,851 | B2 | 8/2006 | Whitmarsh et al. |
| 7,270,027 | B2 | 9/2007 | Berger et al. |
| 7,490,528 | B2 | 2/2009 | Koski et al. |
| 8,053,691 | B2 | 11/2011 | Vernacchia et al. |
| 2002/0088684 | A1* | 7/2002 | Hoess et al. ............... 192/219.5 |
| 2007/0283735 | A1* | 12/2007 | Schweiher et al. ............. 70/245 |
| 2011/0146439 | A1 | 6/2011 | Saitner et al. |
| 2011/0198190 | A1* | 8/2011 | Steinhauser et al. ....... 192/219.5 |
| 2014/0144733 | A1* | 5/2014 | Frait ......................... 188/106 R |

FOREIGN PATENT DOCUMENTS

FR    2578607 A1    9/1986

* cited by examiner

*Primary Examiner* — Richard Lorence
(74) *Attorney, Agent, or Firm* — James Dottavio; MacMillan, Sobanski & Todd, LLC

(57) ABSTRACT

A park-brake actuator includes a cam including first serrations and an open-ended slot, a piston including second serrations displaceable relative to the cam in response to variable pressure applied to the piston, a spring, and a rod including a pin urged by the spring toward the slot and contact with the first and second serrations, the pin moved by piston displacement from the slot, onto one of the first serrations to a flat-tow position.

19 Claims, 5 Drawing Sheets

PARK BRAKE ACTUATOR

BACKGROUND OF THE INVENTION

1. Field of the Invention

This invention relates generally to actuation of a motor vehicle park brake that produces engagement, disengagement and flat-tow operation of a park brake operated by a shift-by wire system.

2. Description of the Prior Art

Parking mechanisms or assemblies are used in automotive vehicles to allow the vehicle to enter into and maintain a "parked" condition or state. Parking assemblies typically include a park rod, which selectively actuates a parking pawl that operatively engages the vehicle's park gear, thereby maintaining the vehicle in a "parked" position or state.

The park rod is typically mechanically linked to the vehicle's shifter and moves in response to shifter movement. When the shifter is moved to the "park" position, a contact member, which is disposed on the park rod, engages the parking pawl, which pivots or rotates into a position where it is disposed between a pair of teeth on the park gear, thereby substantially preventing the park gear and the output shaft from further rotating.

The park rod includes a spring which is sometimes compressed during the engagement with the parking pawl. Particularly, the spring within the park rod is compressed only during certain shifts into park. For instance, when the park rod contact member engages the parking pawl and causes it to pivot into the park gear, the parking pawl is sometimes pivoted into and forcibly abuts a tooth of the park gear. During these types of shifts, the pivotal movement of the parking pawl is temporarily limited or stopped, thereby preventing further movement of the contact member until the park gear is rotated and causing the spring within the park rod to be compressed. When the park gear rotates, the parking pawl slides along the tooth which it abuts until it "drops into" or is forced into a space between teeth of the park gear. During other shifts into the park position, the parking pawl pivots directly into a space between gear teeth. During these types of shifts, the path of travel of the park rod is substantially unobstructed and the spring within the park rod is not compressed. The resulting inconsistency of spring compression causes the force required to shift the vehicle into park to vary from shift to shift. Because the shifter is mechanically coupled to the park rod in these prior systems, the user or driver of the vehicle undesirably "feels" or experiences inconsistent or different forces at the shifter when shifting the vehicle into park. Furthermore, when shifting a vehicle out of the park position while the vehicle is disposed on an incline, the loading of the park pawl will vary with the loading of the vehicle. This causes the park "pull out" load to vary based upon the vehicle weight and incline. This load variation is likewise undesirably experienced by an operator of the vehicle.

Another drawback with these prior mechanical systems occurs when a driver inadvertently shifts into park while the vehicle is still moving. Particularly, if the vehicle is moving above a certain speed, the parking pawl may not fully engage the park gear, but rather "ratchets" against the gear, thereby creating an unaesthetic sound and vibration and potentially damaging the parking pawl and park gear. Moreover, when residual torque remains within the output shaft during a parking event (e.g., when the vehicle is parked on an inclined or declined surface), the park gear imparts a torsional force or load on the parking pawl which may be transmitted through the park rod and result in undesirable vibrations which can be "felt" or experienced at the vehicle's shifter.

Vehicles which utilize a "shift by wire" system, where the shifter is mechanically coupled to and actuates the park rod by use of a wire or cable, suffer from other drawbacks. By way of example and without limitation, the cable may act as a noise and/or vibration path or medium which generates undesirable noise and/or vibration that can be experienced within the passenger compartment.

SUMMARY OF THE INVENTION

A park-brake actuator includes a cam including first serrations and an open-ended slot, a piston including second serrations displaceable relative to the cam in response to variable pressure applied to the piston, a spring, and a rod including a pin urged by the spring toward the slot and contact with the first and second serrations, the pin moved by piston displacement from the slot, onto one of the first serrations to a flat-tow position.

By using a cam follower that limits travel of the park-apply rod, a single hydraulic control can be used for both normal Park and no-Park operation, and to latch and unlatch the actuator for engine-off, flat-tow operation.

The Park-apply rod is loaded through two springs in series. The first spring is of the rate needed for the Park-state and no-Park state. The second spring has a higher rate requiring more pressure to compress it, thereby allowing the two states to be separated enough that one oil source at two different pressures can be used to actuate both functions: normal park operation and flat tow/neutral operation.

The springs are separated by a fluid damper to prevent severe ratcheting forces from accidentally actuating the flat tow/neutral state.

The actuator uses the same control servo oil source to activate the neutral latch, and requires no additional valves, just the cam follower system.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

The invention will be more readily understood by reference to the following description, taken with the accompanying drawings, in which.

DESCRIPTION OF THE PREFERRED EMBODIMENT

Figure 1:
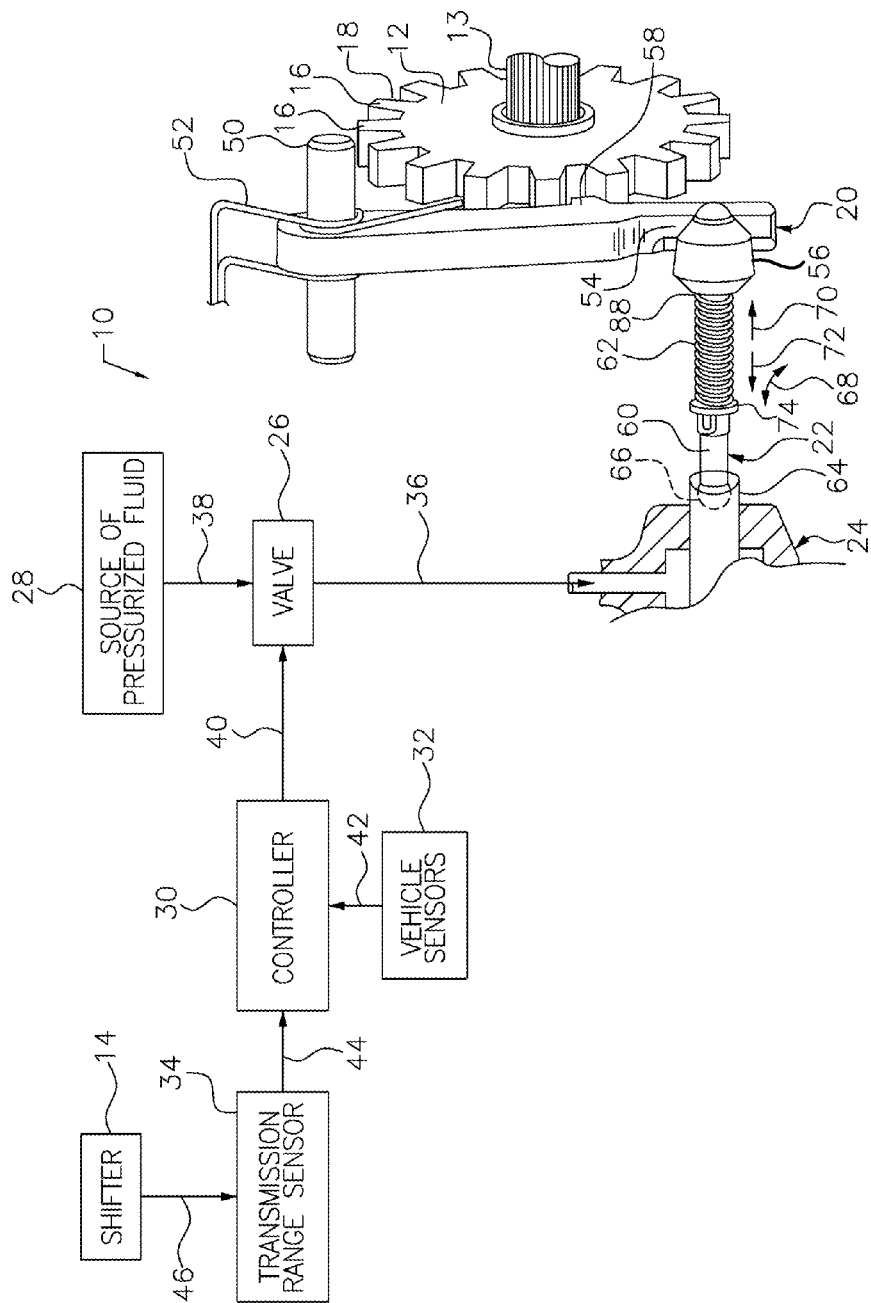
FIG. 1 is a schematic diagram of a parking assembly.

The parking assembly 10 shown in FIG. 1 is adapted for use in combination with a vehicle having a park gear 12 and a shifter 14, by which the operating range of an automatic transmission is selected manually.

Park gear 12 is secured to the vehicle's transmission output shaft 13 and rotates with the output shaft 13. Park gear 12 includes several peripherally disposed and substantially identical teeth or projections 16, each tooth 16 being separated from an adjacent tooth by a recess portion 18. When the parking pawl 20 engages the park gear 12 by entering one of the recesses, thereby substantially preventing the park gear 12 and output shaft 13 from rotating.

The shifter 14 is movable among several positions, such as a "park" position, "reverse" position, "neutral" position, and "drive" position (P R N D), which respectively correspond to various operating states of the transmission. The operating states may be selected by moving a shifter lever or by a push-button.

Parking assembly 10 includes a selectively and pivotally movable parking pawl 20, a park rod 22, and an actuator 24, which selectively produces longitudinal displacement of park rod 22. Actuator 24 is operatively and communicatively coupled to an electronically controlled valve assembly 26 (e.g., a solenoid valve) through a conduit 36. Valve 26 is communicatively coupled to a source of pressurized fluid 28 (e.g., a conventional fluid reservoir and pump assembly) by a conduit 38. Pressurized fluid received through conduit 36 controls the operation of actuator 24. The actuator 24 may be actuated hydraulically, pneumatically, or electromagnetically, such by an electric motor.

Valve assembly 26 is further communicatively coupled to an electronic controller 30 by a bus 40. Controller 30 controls the operation of valve 26 based upon data (e.g., vehicle speed data, gear selected and/or time data) received from vehicle sensors 32 and transmission range sensor 34, which are respectively and communicatively coupled to controller 30 by use of busses 42, 44. The sensors 32 are vehicle attribute sensors, which are effective to measure or sense certain vehicle attributes (i.e., vehicle speed data) and to communicate signals to controller 30 representing those measured attributes. Transmission range sensor 34 is further communicatively coupled to shifter 14 by bus 46 and is effective to sense or detect the position of shifter 14. In other alternate embodiments, transmission range sensor 34 may be mechanically coupled to the shifter 14.

Parking pawl 20 pivots on a park pawl shaft 50, which is secured to a fixed component, such as a transmission housing. A torsion spring 52 continually applies a force to pawl 20 tending to disengage the pawl from the park gear 12 and to hold a rod-engaging surface 54 in contact with a contact member 56 on the park rod assembly 22. Pawl 20 is formed with a tooth projection 58, which selectively enters a recess 18 between successive teeth 16 on the park gear 12, thereby preventing rotation of the park gear 12 and the vehicle's transmission output shaft 13.

Park rod assembly 22 includes a park rod 60; a contact member 56, which slides on park rod 60; and a spring member 62, which is operatively disposed around the park rod and abuts contact member 56. Park rod 60 is pivotally coupled to a park apply rod 64 by a ball and socket joint 66. In this manner, park rod 60 is able to flex or move with respect to park apply rod 64 in the directions of arrow 68 when contact member 56 engages the surface 54 of pawl 20. Contact member 56 slides on park rod 60 and is movable relative to park-apply rod 64 in the directions of arrows 70, 72. One end of spring 62 abuts contact member 56 and the opposite end of spring 62 abuts a washer 74, which is secured to park rod 60.

Figure 2:
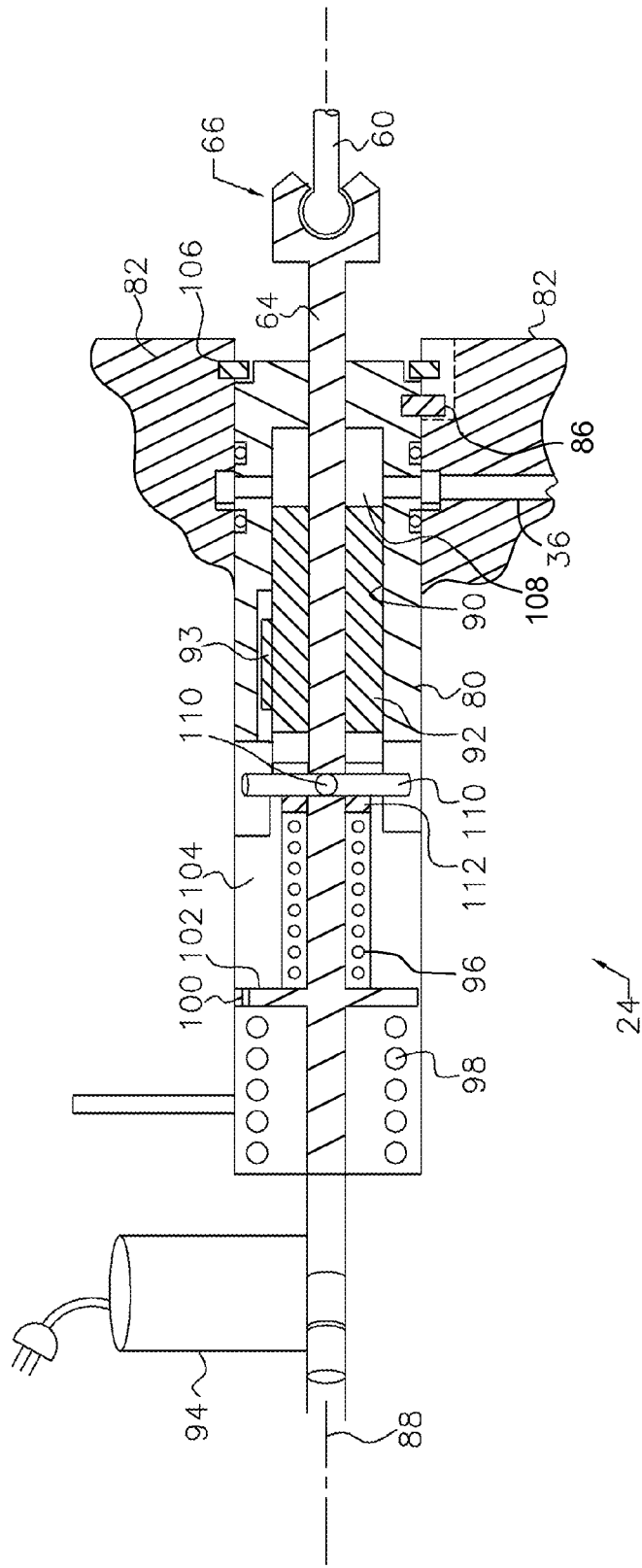
FIG. 2 is cross sectional side view of the actuator in FIG. 1.

FIG. 2 shows that actuator 24 includes a cam 80, which secured to a housing 82 by a roll pin 86, thereby preventing its rotation about a central, longitudinal axis 88. The cam 80 is formed with a bore 90 containing a hydraulic piston 92, which is connected by a key 93 against rotation relative to the cam yet allows axial displacement along axis 88. Piston 92 is displaced leftward along axis 88 preferably by hydraulic pressure supplied through conduit 36 to the bore 90 of cam 80. Piston 92 is displaced rightward by forces produced by a park apply spring 96 and a flat-tow spring 98 or by any suitable means, such as an electric motor, solenoid, or servo of any sort, etc.

Piston 92 moves among three states. A position sensor 94 is used to verify that the desired state is produced.

Piston movement from a park-state to a no-park-state requires constant application of leftward force to the piston 92; otherwise, the piston will return to the park-state, its default position or state due to the force of a park apply springs 96 and a flat-tow spring 98. The spring rate of spring 96 is lower than the spring rate of spring 98. When park-apply spring 96 is fully compressed, the load applied to park rod 60 per unit displacement of the park apply rod 64 increases due to the higher spring rate of the flat tow spring 98, thereby allowing for some leeway in the actuation force required to reach the no-park state.

The actuator 24 is further enhanced by a damper orifice 100 formed in a piston 102, which is secured to the park apply rod 64 and located axially between the park-apply spring 96 and the flat-tow spring 98. The chamber 104 extends on opposite sides of piston 102 and contains a fluid, preferably hydraulic fluid. As the Park-apply rod 64 is displaced along axis 88, fluid in chamber 104 flows through damper orifice 100, thereby dissipating energy and stiffening the actuator 24 against very rapid and violent forces experienced during ratchet events of a park system that has been actuated while the park gear 12 is rotating. This stiffness prevents actuation of the flat-tow spring 98 inadvertently. Piston 102 functions similarly to a shock absorber, and is tuned preferably to prevent rapid, axial displacement and to control displacement of the park apply rod 64.

The park apply rod 64 is connected preferably by a joint to the park rod 60, to which contact member 56 and spring 62 are secured (see FIG. 1). Although joint 66 is shown as a ball joint, other types of joints can be used as well.

Preferably a snap ring 106 secures the actuator 24 to the housing 82, although other fastening techniques may be used.

In operation, when the shifter 14 is in the Park position and the vehicle is in a parked condition or state as determined by controller 30 in response to signals produced by sensors 32, 34, valve assembly 26 is closed such that no hydraulic pressure is supplied through conduit 36 to chamber 108. Then spring 96 expands, causing contact member 56 to engage parking pawl 20, forcing the pawl to engage park gear 12, and holding the vehicle driveline against rotation.

When shifter 14 is moved out of the Park position, sensor 34 produces a signal to controller 30, which, determines whether a shift out of park is allowable. If so, valve assembly 26 opens, allows fluid pressure to enter chamber 108, and causes piston 92 to move leftward, disengages pawl 20 from park gear 12, and releases the park brake with the force of spring 52.

A cross pin 110, secured to park-apply rod 64 and extending diametrically through the park-apply rod, can rotate about axis 88 relative to the cam 80. In FIG. 2, pin 110 is shown in both its vertical and horizontal positions. Springs 96, 98 continually apply rightward force to park-apply rod 64 through a washer 112.

As shown in FIGS. 6-9, the left-hand end of piston 92 is formed with a series of serrations having peaks 114, 115, 116 and valleys 118, 119. Similarly, the left-hand end of cam 80 is formed with a series of inclined surfaces 120, 122, and an axial slot 124 sized to receive and allow pin 110 to move axially in the slot. These features of the piston 92 and cam are not shown in FIG. 2 for clarity in showing the overall actuator assembly.

Figure 3:
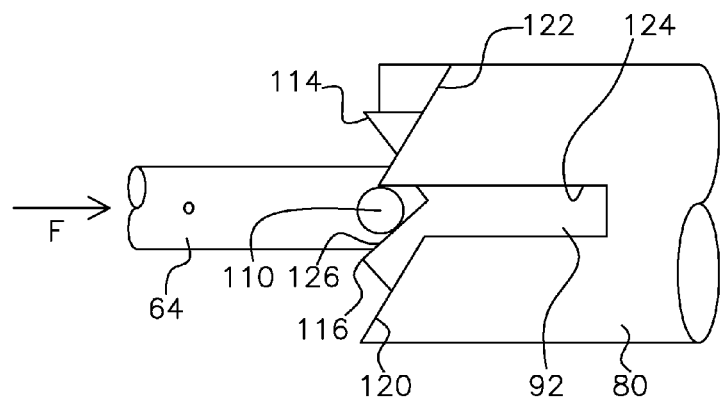
FIGS. 3-9 illustrate progressive positions of a cross pin on the cam and piston during a full cycle of flat-tow/neutral engagement and disengagement.
Figure 5:
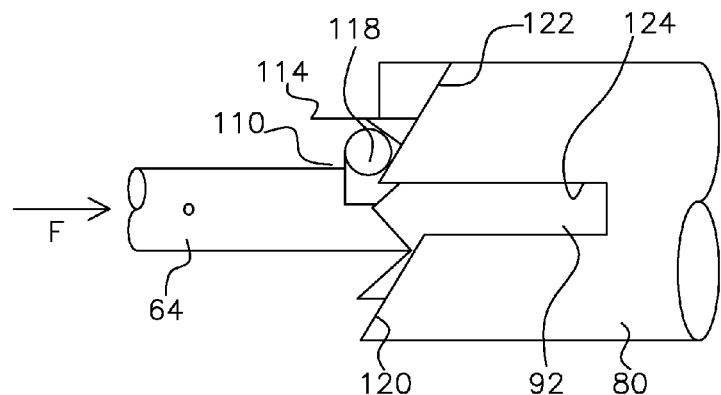
Figure 6:
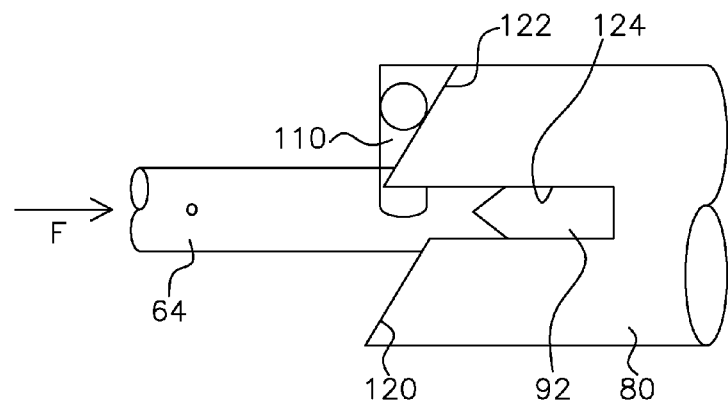

Movement of actuator 24 to and from the flat-tow/neutral position of FIG. 6 is described next with reference to FIGS. 3-9, in view of FIGS. 1 and 2. FIG. 3 shows piston 92 having pushed pin 110 to the edge of slot 124 on the serrated surface 126 of the piston in response to hydraulic pressure in chamber 108. Additional leftward displacement of piston 92 frees pin 110 from slot 124.

Figure 4:
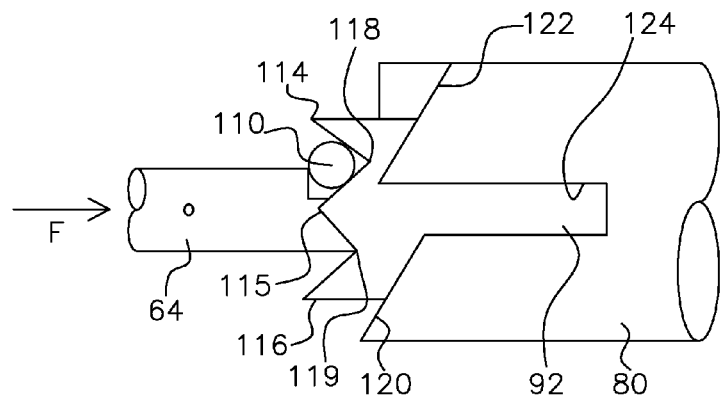

FIG. 4 shows piston 92 having freed pin 110 from slot 124 of cam 80. Spring force F on park-apply rod 64 has urged pin 110 to rotate to the bottom of a recess between peaks 114, 115 of the serrations on piston 92, since the pin 110 is no longer prevented by cam 80 from rotating.

FIG. 5 shows piston 92 having retracted rightward due to the spring forces F and reduced pressure in chamber 108 until pin 110 moves out of contact with the piston. Pin 110 contacts the serrated inclined surfaces 122 on cam 80. The force F of park-apply spring 96 urges pin 110 to rotate further while contacting serrated surface 122.

FIG. 6 shows piston 92 fully retracted due to pressure in chamber 108 being reduced substantially to zero, and pin 110 having rotated to its vertical, flat-tow position against inclined surface 122 of cam 80 due to the force F of the park-apply spring 96. No source of power such as pressure in chamber 108 or electric power is required to maintain actuator 24 in its flat-tow position.

Figure 7:
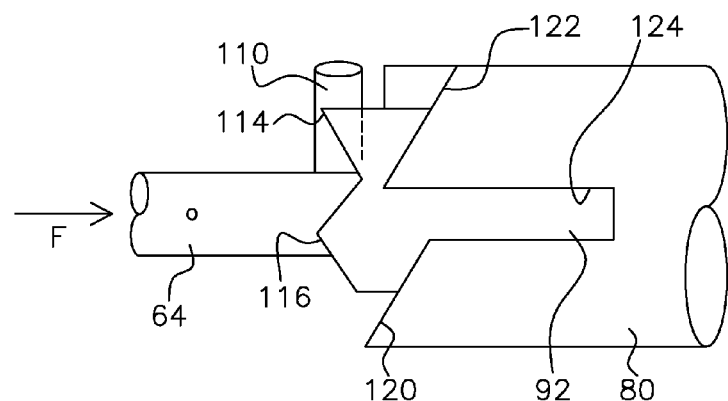

FIG. 7 shows piston 92 being stroked leftward from the fully retracted position of FIG. 6 by increased hydraulic pressure in chamber 108 until pin 110 is separated from cam 80. Then pin 110 is urged to one of the piston's valleys, causing pin 110 to rotate until contacts the inclined surface 120 of cam 80.

Figure 8:
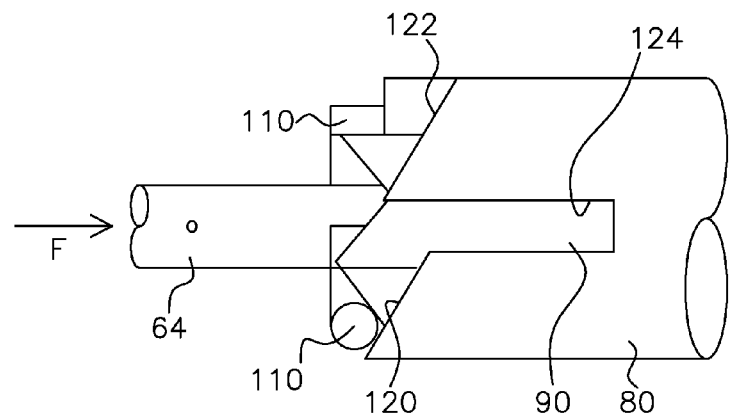
Figure 9:
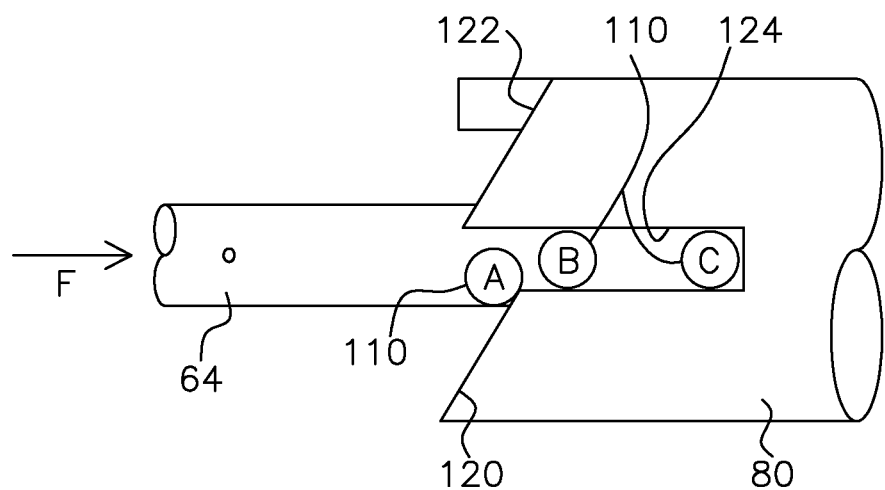

FIG. 8 shows piston 92 fully retracted rightward, pin 110 urged to travel along inclined surface 120 into the Park, no-Park slot 124. FIG. 8 shows the actuator having completed a full cycle and the pin having rotated 180 degrees from the position of FIG. 3.

No matter how many times the actuator 24 is cycled between the park-state and no-park state, the park apply rod 64 does not index its location in the cam 80, but remains in the same cam slot moving only axially.

When it is desired to obtain the flat tow/neutral state, park-apply rod 64 must be actuated to travel further so as to move the pin 110 in the park-apply rod out of the slot 124 in the cam 80, and allow the pin 110 to fall to the valley in the piston 92. Upon retraction, i.e., leftward movement, of piston 92, pin 110 in the park apply rod 64 will come to rest in the flat-tow position of the cam 80. This prevents the conventional park systems ratchet cam from touching the park pawl 20. The force required to reach this state is greater than that required to actuate the Park state and the no-Park state. This allows one control force/pressure to obtain all three states of the system.

To return to the Park-state from the flat tow/neutral state, the piston 92 is simply stroked with the same pressure used to reach flat tow and the pin 110 is lifted from the cam valley and slides back into the next available slot 124 ready for Park engagement.

The actuator 24 can be cycled through this range of states any number of times to calibrate the sensor 94, to verify its functionality, or for any other reason.

In accordance with the provisions of the patent statutes, the preferred embodiment has been described. However, it should be noted that the alternate embodiments can be practiced otherwise than as specifically illustrated and described.

The invention claimed is:
1. A parking assembly, comprising:
a cam including first serrations and an open-ended slot;
a piston including second serrations displaceable relative to the cam in response to variable pressure applied to the piston;
a spring;
a rod including a pin urged by the spring toward the slot and contact with the first and second serrations, the pin moved by piston displacement from the slot, onto one of the first serrations to a flat-tow position.

2. The parking assembly of claim 1, wherein the cam is fixed against axial displacement and rotation.

3. The parking assembly of claim 1, wherein the slot includes a closed end stop surface that limits movement of the pin in the slot.

4. The parking assembly of claim 3, wherein contact between the pin and the stop surface corresponds to a Park state of the actuator.

5. The parking assembly of claim 3, wherein the pin being located in the slot between the stop surface and the open end of the slot corresponds to a no-Park state.

6. The parking assembly of claim 1, wherein the pin is urged by the spring in opposition to said variable pressure toward the first and second serrations and into the slot.

7. The parking assembly of claim 1, further comprising a second spring having a spring constant greater than a spring constant of the spring, a force produced by the second spring being applied to the pin.

8. The parking assembly of claim 7, further comprising:
a first chamber containing hydraulic fluid;
a baffle secured to the rod, located in the chamber between the spring and the second spring, the baffle formed with an orifice through which fluid flows as the rod is displaced in the chamber.

9. The parking assembly of claim 1, further comprising:
a park rod connected to the rod and to a pawl;
a park gear rotationally fixed to a transmission output shaft and alternately engaged and disengaged by the pawl in response to displacement of the rod.

10. A parking assembly, comprising:
a cam including first serrations and an open-ended slot;
a piston including second serrations displaceable relative to the cam in response to variable pressure applied to the piston;
a first and second springs located in a chamber containing fluid;
a rod including a pin urged by the springs toward the slot and contact with the first and second serrations, the pin moved by piston displacement from the slot, onto one of the first serrations to a flat-tow position,
a damper secured to the rod and located in the chamber.

11. The parking assembly of claim 10, wherein the cam is fixed against axial displacement and rotation.

12. The parking assembly of claim 10, wherein the slot includes a closed end stop surface that limits movement of the pin in the slot.

13. The parking assembly of claim 12, wherein contact between the pin and the stop surface corresponds to a Park state of the actuator.

14. The parking assembly of claim 12, wherein the pin being located in the slot between the stop surface and the open end of the slot corresponds to a no-Park state.

15. The parking assembly of claim 10, wherein the pin is urged by the springs in opposition to said variable pressure toward the first and second serrations and the slot.

16. The parking assembly of claim 10, further comprising:
a park rod connected to the rod and to a pawl;

a park gear rotationally fixed to a transmission output shaft and alternately engaged and disengaged by the pawl in response to displacement of the rod.

17. A method for operating a parking assembly, comprising:
fixing a cam including first serrations and an open-ended slot against axial displacement and rotation;
supporting a piston including second serrations for displaceable relative to the cam in response to variable pressure applied to the piston;
applying a spring force to a rod that includes a pin urged by a spring toward the slot and contact with the first and second serrations;
using piston displacement and the second serrations to move the pin from the slot, onto one of the first serrations to a flat-tow position.

18. The method of claim 17, further comprising maintaining the pin in the flat-tow position by reducing said variable pressure to zero.

19. The method of claim 17, further comprising:
removing the pin the pin from in the flat-tow position by increasing said variable pressure;
using said variable pressure to remove the pin from the first serration; and
using said variable pressure to move the pin onto the second serrations.

* * * * *